(12) United States Patent
Perrault

(10) Patent No.: US 6,546,926 B1
(45) Date of Patent: Apr. 15, 2003

(54) BRICKLESS STOVE

(76) Inventor: Charles Perrault, 2138 Country Club Drive, Burlington, Ont. (CA), L7M 4A8

( * ) Notice: Subject to any disclaimer, the term of this patent is extended or adjusted under 35 U.S.C. 154(b) by 0 days.

(21) Appl. No.: 09/868,728

(22) PCT Filed: Oct. 24, 2000

(86) PCT No.: PCT/CA00/01234
§ 371 (c)(1),
(2), (4) Date: Jun. 21, 2001

(87) PCT Pub. No.: WO01/31258
PCT Pub. Date: May 3, 2001

(30) Foreign Application Priority Data

Oct. 27, 1999 (CA) .............................................. 2287678

(51) Int. Cl.[7] .................................................. F24C 1/14
(52) U.S. Cl. .............................. 126/77; 126/65; 126/60; 126/83
(58) Field of Search ............................... 126/64, 65, 77, 126/66, 60, 61, 83, 528, 529, 530, 531, 80

(56) References Cited

U.S. PATENT DOCUMENTS

| | | | | |
|---|---|---|---|---|
| 1,136,615 A | * | 4/1915 | Rice | 126/77 |
| 4,194,490 A | * | 3/1980 | Crnkovic | 126/39 M |
| 4,232,650 A | * | 11/1980 | Frank | 126/77 |
| 4,374,514 A | * | 2/1983 | Pierce | 126/61 |
| 4,440,145 A | * | 4/1984 | Neyenhouse | 126/61 |
| 4,665,889 A | | 5/1987 | Rumens | 126/77 |
| 4,766,876 A | * | 8/1988 | Henry et al. | 126/77 |
| 4,832,000 A | | 5/1989 | Lamppa | 126/77 |
| 4,941,451 A | | 7/1990 | Gilham | 126/77 |
| 5,357,941 A | * | 10/1994 | Hans Duerichen et al. | 126/77 |

FOREIGN PATENT DOCUMENTS

| | | | |
|---|---|---|---|
| CA | 148145 | 5/1913 | |
| CA | 288175 | 3/1929 | |
| CA | 1130678 | 8/1982 | 126/62 |
| CA | 1098780 | 4/1986 | 126/62 |
| CA | 2040556 | 10/1992 | 126/37 |

* cited by examiner

*Primary Examiner*—James C. Yeung

(57) ABSTRACT

A wood burning stove in the shape of a barrel having both primary and secondary air inlets for supplying clean combustion. Primary air is fed into the stove from above the door. Secondary air is fed into a heating duct which extends along the bottom of the stove to be preheated. The heating duct empties the preheated air into a plenum formed in the end of the stove remote from the door. Air admitted to the plenum is additionally heated by exposure to a series of heat transfer fins within the plenum. The shape of the plenum is such that the velocity of air in the central portion of the plenum is the slowest, allowing for efficient heat transfer from the plenum walls and fins to the air passing through. A baffle mounted in the stove above the fire shields the fire from the exhaust outlet. Secondary air is admitted into the interior of the stove from the plenum from a first set of ports near the top of the plenum. Additional ports located in the baffle and spaced some distance from the plenum feed tertiary air into the stove at some distance from the plenum. The entire interior surface of the stove is coated with a suitable glass material.

24 Claims, 9 Drawing Sheets

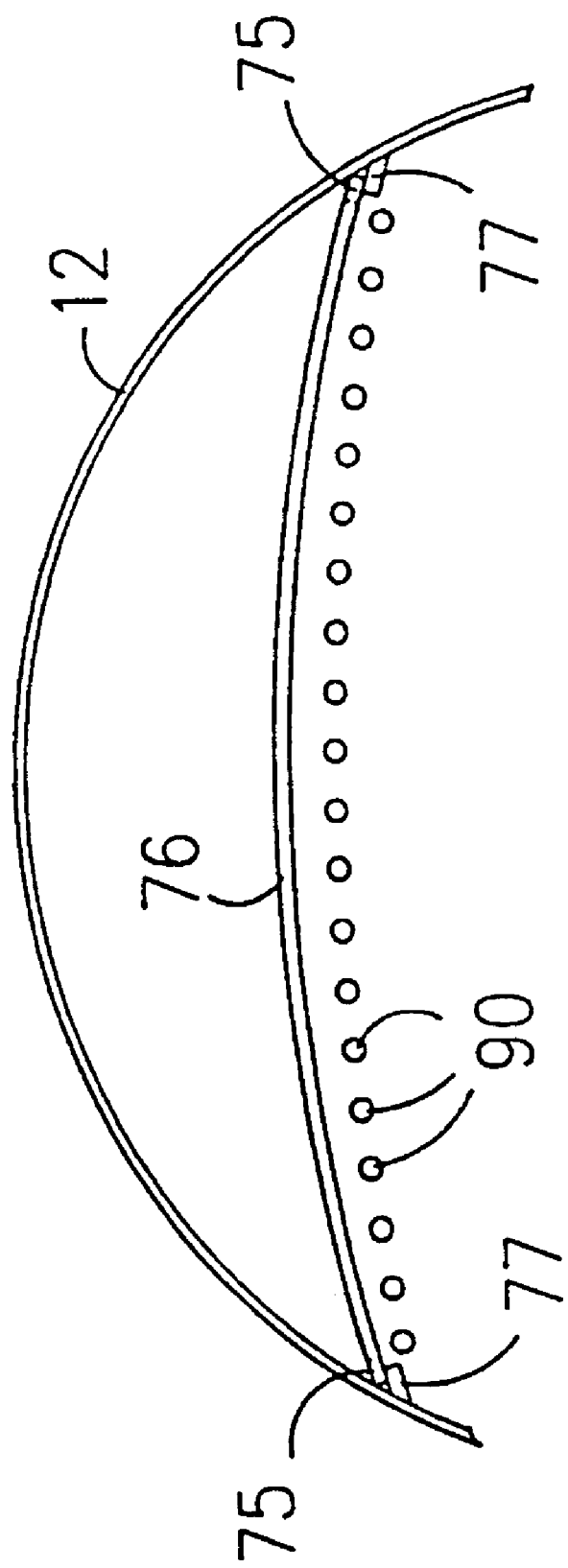

BRICKLESS STOVE

FIELD OF INVENTION

This invention is directed to a heating stove which is not limited to but preferably to stoves adapted to the burning of wood.

BACKGROUND OF THE INVENTION

Mankind has made use of heating appliances generally categorized as stoves for hundreds of years. For the most part, the primary function of stoves until recently was for cooking and heating. While this is still true today, other factors have driven the design of stoves to produce heat more efficiently while discharging less of the undesirable byproducts of combustion into the atmosphere. Prior art stoves have traditionally had the capability of producing large amounts of heat, whilst simultaneously producing large undesirable amounts of noxious substances which were expelled into the atmosphere by the burning fuel.

In order to provide an acceptable life for most of the prior art woodburning stoves, manufacturers usually provided a metallic shell in which firebricks and/or heavy iron castings were formed and fitted into a firebox in order to protect and shield the inner surface of the outer metallic shell of the stove from the burning fuel. The resultant stove tended to be quite massive, slow to heat and difficult to move. Because of the massiveness of these stoves, considerable heat energy is required just to raise the temperature of the stove to the desirable operating temperature.

Recently stove manufacturers resorted to producing an "airtight" stove which limited the amount of combustion air allowed to the firebox so that a firebox filled with wood could be made to burn at a controlled rate for many hours.

Because of the lack of oxygen supplied to the burning wood, these "airtight" stoves tended to produce copious amounts of creosote and other gaseous products resulting from incomplete combustion of the burning fuel because of oxygen starvation. The low temperature of the emitted flue gas also allowed creosote and other noxious substances to be deposited in the cold chimney flue.

Continued use of these "airtight" stoves usually resulted in a chimney fire from time to time. Because of the problems associated with this type of heating appliance, environmental authorities had little choice but to introduce stringent restrictions on the types of stoves which could be sold in each jurisdiction.

In 1988 the U.S. Environmental Protection Agency introduced a set of standards for New Residential Wood Heaters under Title 40—Code of Federal Regulations Part 60, which has had a great influence on the design of stoves which have been and are to be introduced into the U.S. market. The presence of these Regulations has provided stove manufacturers all over the world with a set of guidelines to measure the efficiency of any wood burning stove and the resulting production of any undesirable emitted materials produced by the stove under test during a monitored burning operation so as to enable a comparison of the test stove results against a (set of) given standard(s).

It is with a view to the production of a stove which is able to easily meet the 40 C.F.R. (60) regulations that this invention is directed.

DISCUSSION OF PRIOR ART

U.S. Pat. No. 4,941,451 Jul. 17, 1990

A stove having a firebox which is surrounded by multiple air chambers is described. Primary air enters the front of the stove just below the door and is ducted to the top of the firebox where it is directed downwardly from a point well above the burning fire to induce combustion of the fuel in the firebox.

Cooling air for the stove also enters the stove in an opening in the bottom of the stove below the firebox floor. A fan is shown propelling air entering the opening into three separate streams.

A first stream is ducted up the back of the stove behind the firebox and across the top of the stove and out to the room via louvres.

A second stream is ducted upwardly in a pair of riser tubes to empty from a manifold above the fire but below the hollow baffle. Air leaves a secondary manifold to ignite and burn unburned gases.

A third stream enters the hollow baffle from a side space. This air cools the baffle and exits through a series of holes above the second secondary stream.

A slider type draft control adjusts the amount of primary air fed to the firebox. The secondary air is pressurized by a fan in the plenum beneath the firebox floor.

U.S. Pat. No. 4,832,000

This patent uses separate primary and secondary airflows to improve the combustion of the fuel in the firebox. Both primary and secondary airflows are preheated.

U.S. Pat. No. 4,665,889

A stove having a baffle and separate primary and secondary airflow paths is illustrated. The primary air is not really heated, but the secondary air is heated during its passage through the secondary duct work.

SUMMARY OF THE INVENTION

This invention is directed to a stove which is extremely lightweight (in comparison to the heavy stoves of recent vintage) and typically uses sheet steel as the basic material for forming an enclosure for a typical stove fire box. The interior of the sheet material forming the firebox is preferably coated with a layer of a preselected material which is resistant to break down due to exposure to high temperature and the products of combustion present in a firebox. The sheet steel which forms the firebox of the stove of this invention is typically coated with a protective layer of a suitable glass material on the inside surface to protect the steel sheet from the effects of exposure to the high temperatures existing in a firebox and the combustion byproducts produced therein. The sheet steel is typically a mild steel with low carbon content which lends itself to the glass coating process which must be carried out in an oven at temperatures approaching 1500° F. The glass coating is selected to be a high temperature glass which contains a small amount of titanium (up to about 8%) which tends to have the effect of making the interior glass surface of the firebox self cleaning. The glass film and the metallic sheet steel base material must have similar coefficients of expansion in order that the glass coating steadfastly adheres to the base material during the many temperature excursions to which the glass coated sheet steel will be subjected over the life of the stove.

The stove is provided with primary and secondary inlet air passages which are designed specifically to control the quantities of primary and secondary inviated air allowed to enter the combustion chamber of the stove during a normal combustion process. The secondary inlet air is ducted through passages in the stove which are placed so as to be in excellent heat transfer relationship with the burning fuel in the combustion chamber of the stove so as to efficiently heat the air in the duct work to a temperature approaching or matching that existing in the combustion chamber of the stove.

The primary air (unheated) enters the stove above the access door and is ducted downwardly so as to sweep downwardly against the inside surface of the glass on the access door. This tends to prevent any buildup of smoke particles on the glass in the door. Because of the difference in density of the cold inlet air and the hot air near the burning fuel, the inlet air tends to make its way to the bottom of the firebox to promote primary combustion.

The stove of this invention is provided with a forwardly extending baffle which extends from the rear of the combustion chamber and which is fastened into the combustion chamber at each side of the baffle to the interior of the stove at some distance beneath the exhaust vent. This baffle prevents the hot air produced during the burning process from exiting directly from the fire into the exhaust vent and up the flue. Because the hot gasses produced by pyrolysis must linger longer in the hot combustion chamber, the chances for oxidation of these gasses to occur is much greater in the presence of the baffle.

The secondary air enters the stove through a draft control (at the front of the stove) and passes through a heat exchanger duct or preheat heat exchanger to the rear of the stove which allows the secondary air to undergo a preheating operating during its passage to the rear of the stove. This preheated air next enters a heat exchanger which defines a plenum or chamber (at the back of the stove) where the air inside the heat exchanger is heated to a temperature approaching the maximum temperature in the combustion chamber. This heated air is allowed to exit from the heat exchanger from preferably two sets of exit ports.

Some of the heated secondary air exits the heat exchanger of the stove from exit ports formed in the heat exchanger just below the point of insertion of the baffle. The balance of the secondary air may de ducted forwardly in the stove toward the front of the combustion chamber in a duct associated with the baffle and which is provided with suitable exit parts in the baffle so that heated air is expelled from these exit ports near the front of the stove.

It is the combination of the admittance of these predetermined volumes of primary and secondary air in the presence of the baffle which determines the efficiency and the U.S.E.P.A. rating of the stove during a burning operation.

Prior art stoves have found it all but impossible to yield acceptable heating efficiencies and E.P.A. rating produced by this stove while simultaneously meeting the emission criteria of 40 C.F.R. Part 60 during a monitored burning operation.

In a first embodiment of this invention, there is provided a wood-burning stove having a combustion chamber which is the general shape of a barrel resting on its side. The interior surfaces of the stove which are exposed to the hot exhaust gases are coated with a suitable glass material. The two "ends" of the "barrel" are specially designed closure members designed to improve the efficiency of the stove. The front closure member has an opening formed therein for providing access to the combustion chamber. The rear closure member is formed into a heat exchanger. The above structure is supported on a base which is incorporated into the structure, and which is provided with a set of legs. The combustion chamber is provided with a baffle to control the flow of the hot gases before exit through the exhaust vent.

BRIEF DESCRIPTION OF THE DRAWINGS

FIG. 10 shows a sectional view of the stove-baffle interface.

DESCRIPTION OF THE PREFERRED EMBODIMENT

Figure 1:
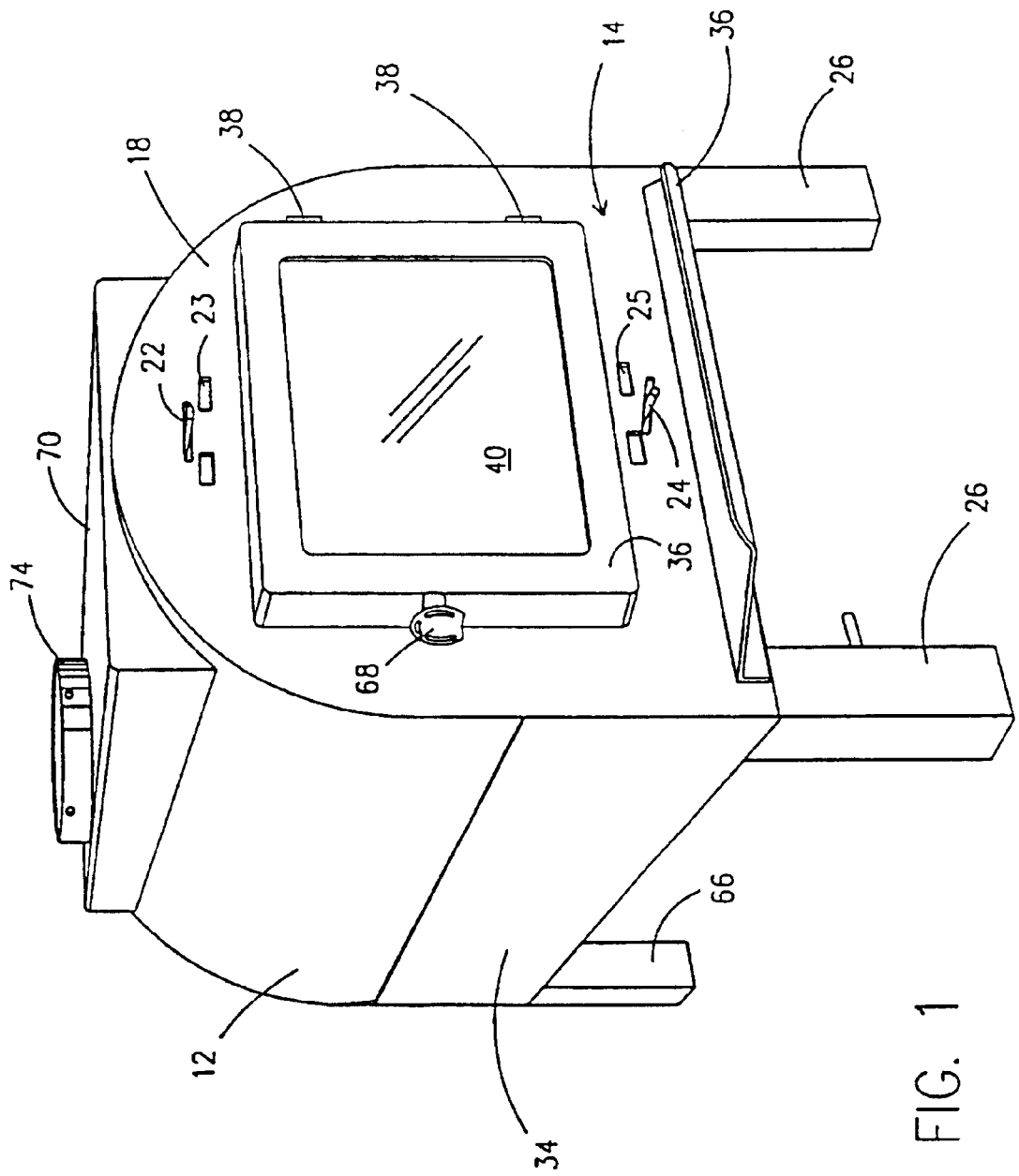
FIG. 1 is a perspective view of the stove of this invention.
Figure 2:
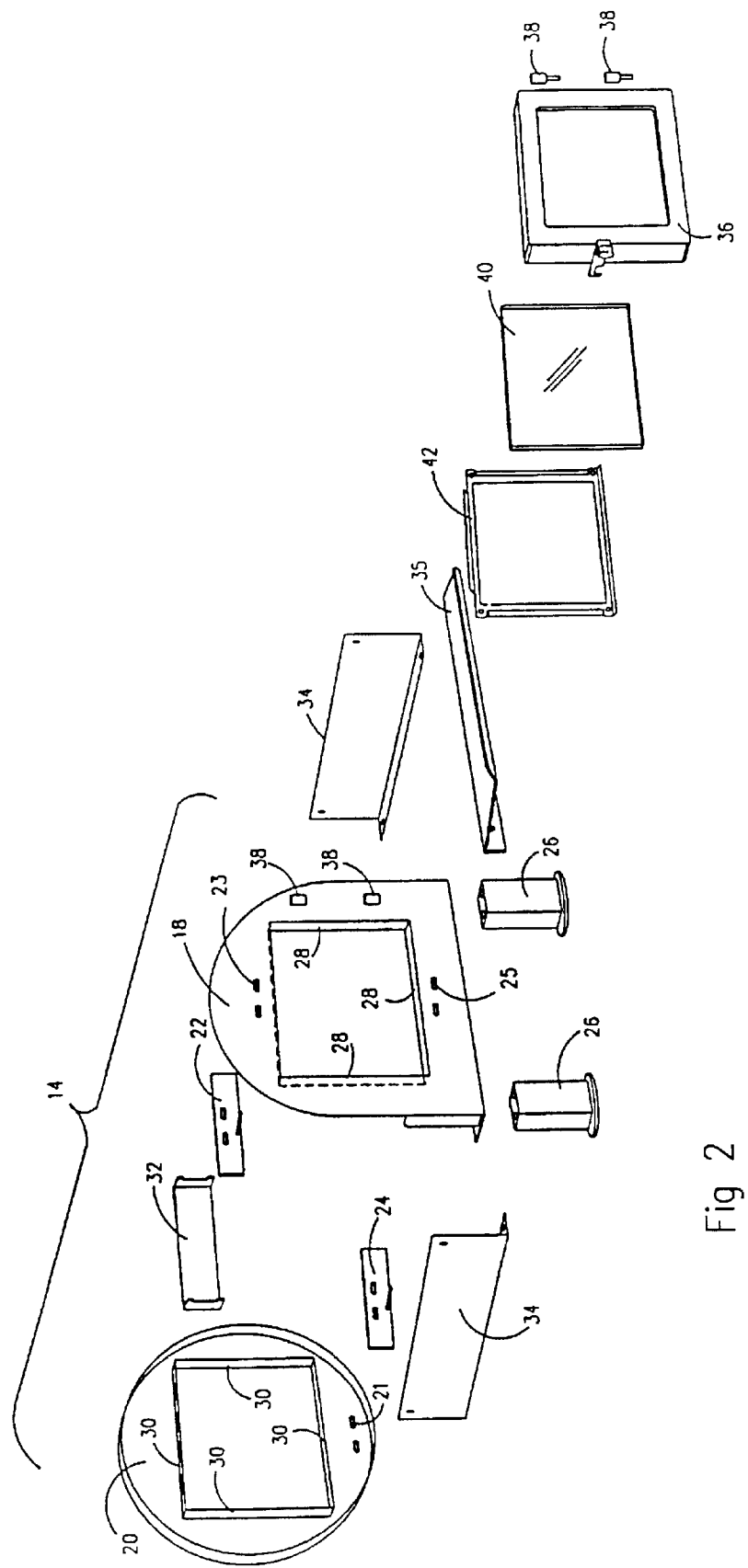
FIG. 2 is an exploded view of the front closure assembly of the stove of FIG. 1.

The stove 10 of this invention is shown in perspective in FIG. 1. The stove 10 comprises a combustion chamber 12 (firebox) which is sealingly attached to a front closure member 14 and a rear closure member 16 (not shown in FIG. 1). The front closure member comprises a front outer panel 18 which is attached to inner panel member 20 (see FIG. 2). Front closure member is a composite structure which provides closed passages for admission of primary and secondary air into the combustion chamber formed within shell 12. A draft control 22 controls the flow of primary air and draft control 24 controls the flow of secondary air into the combustion chamber 12.

Front outer panel 18 provides a framework to which legs 26 are attached to support the front portion of the stove.

The front outer and inner panels 18 and 20 are provided with flanges 28 and 30 respectively which may be welded or otherwise joined together to form a closed composite assembly. Sliding dampers 22 (primary) and 24 (secondary) are assembled into the composite before final welding takes place. Damper 22 is enclosed in a closed box formed by member 32 within front closure member 14.

A pair of side shields (may or may not be required) 34 are attached at one end to front closure member 14. An ashtray 35 may not be necessary) is also attached to front closure member 14.

A door 36 is hingedly mounted on front closure memeber 14 on hinges 38. Door 36 has a glass 40 (in this instance) held in place by inner frame 42.

Figure 3:
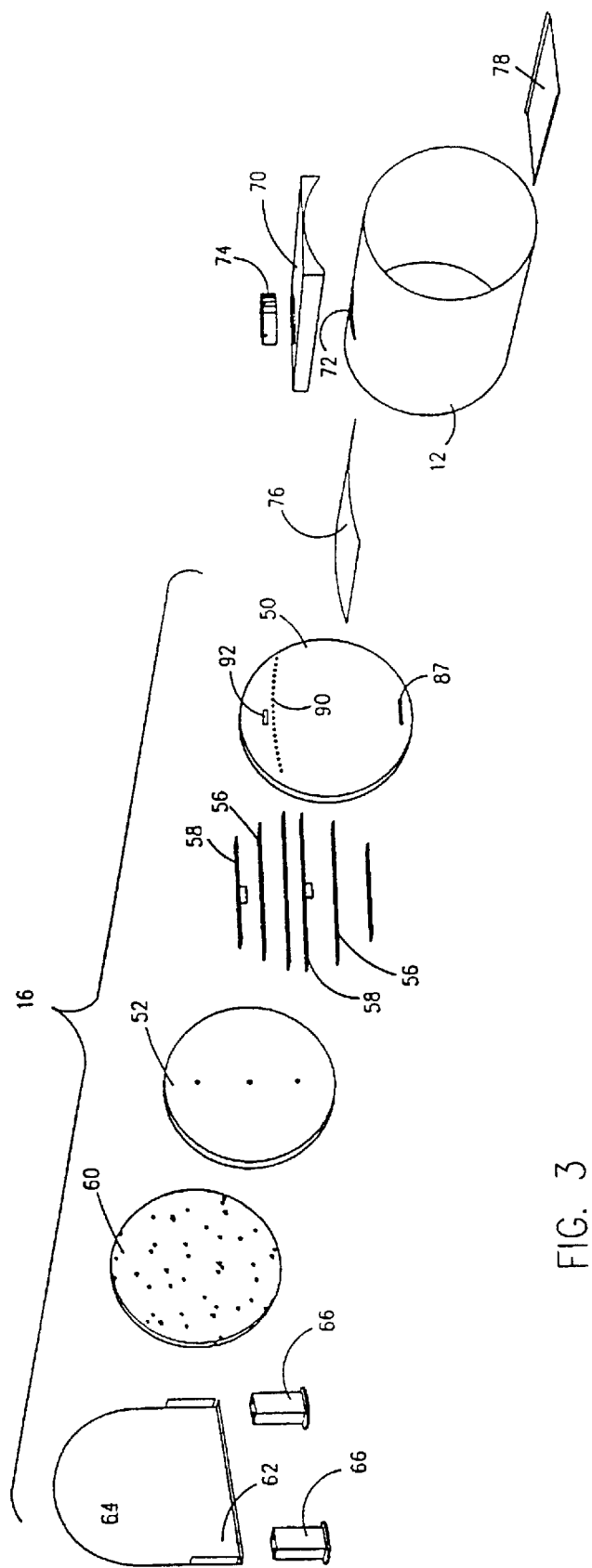
FIG. 3 is an exploded view of the rear closure member of the stove of FIG. 1.

FIG. 3 shows an exploded view of the rear closure member 16 and combustion chamber shell 12. Rear closure member 16 is also a composite, comprising an inner plate 50 and an outer plate 52 which are joined together at their peripheries In a sealed fashion by press fit, welding etc. to from a sealed A series of heat exchanger (88) which defines a heat exchanger chamber 17. Fins 56, 58 are mounted in chamber 17 as will be described later.

An insulation disc 60 is mounted in intimate contact with the outer surface of rear outer plate member 52. A rear frame member 62 having a heat shield 64 (may not be necessary)

serves to support the combustion shell 12 as well as the rear closure member 16 on legs.

Lastly, combustion chamber shell 12 supports a "flat top" 70 on the top thereof, and chamber 12 has an aperture 72 formed therein in which collar 74 is fitted so as to form an exhaust gas vent in combustion chamber shell 12.

Figure 6:
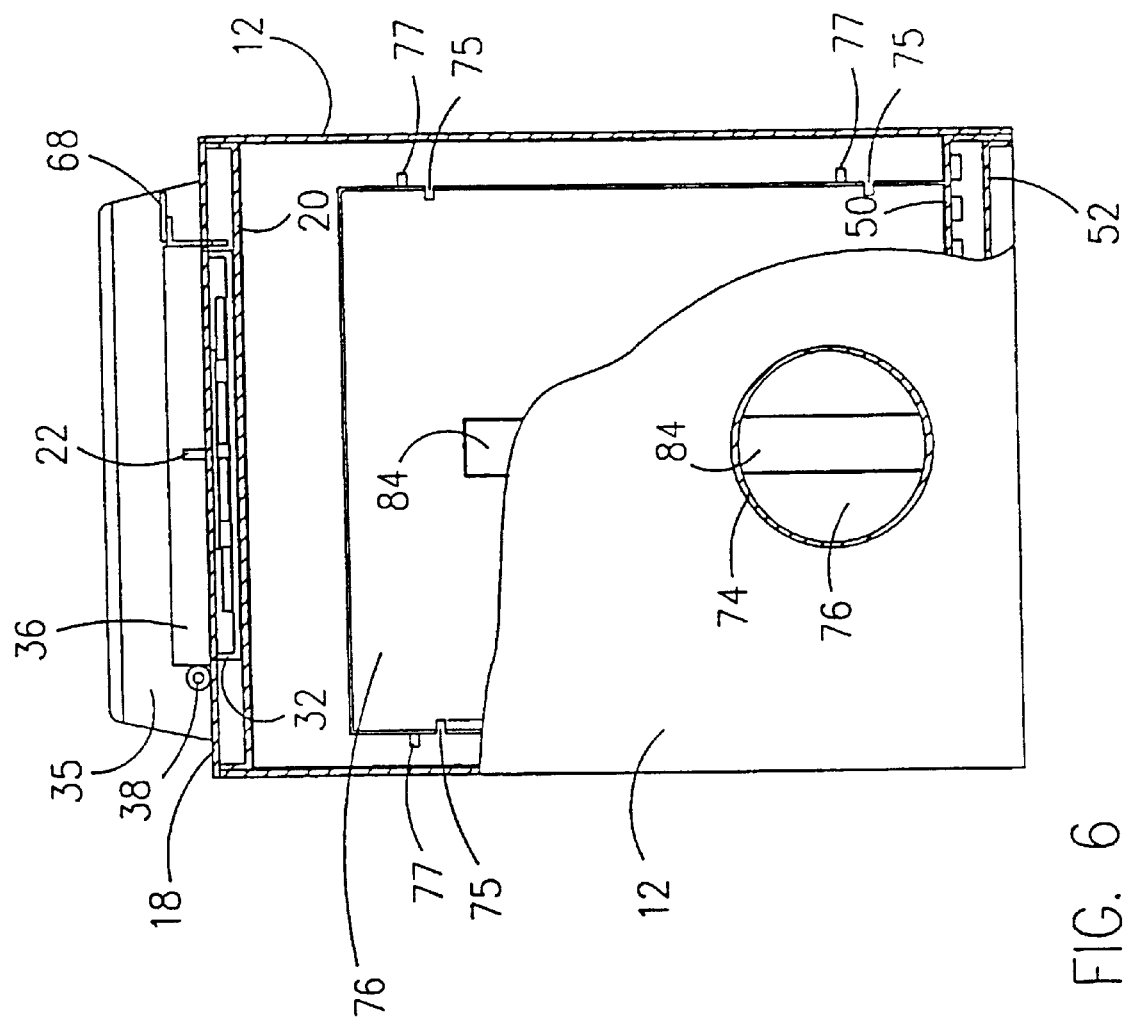
FIG. 6 is a top partial sectional view of the stove of FIG. 1.
Figure 8:
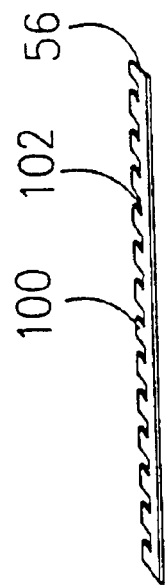
FIG. 8 shows a perspective view of a heat sink fin.
Figure 9:
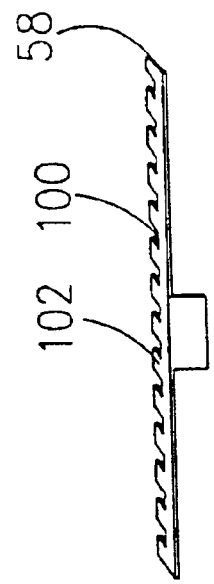
FIG. 9 shows a perspective view of an alternate heat sink fin.
Figure 7:
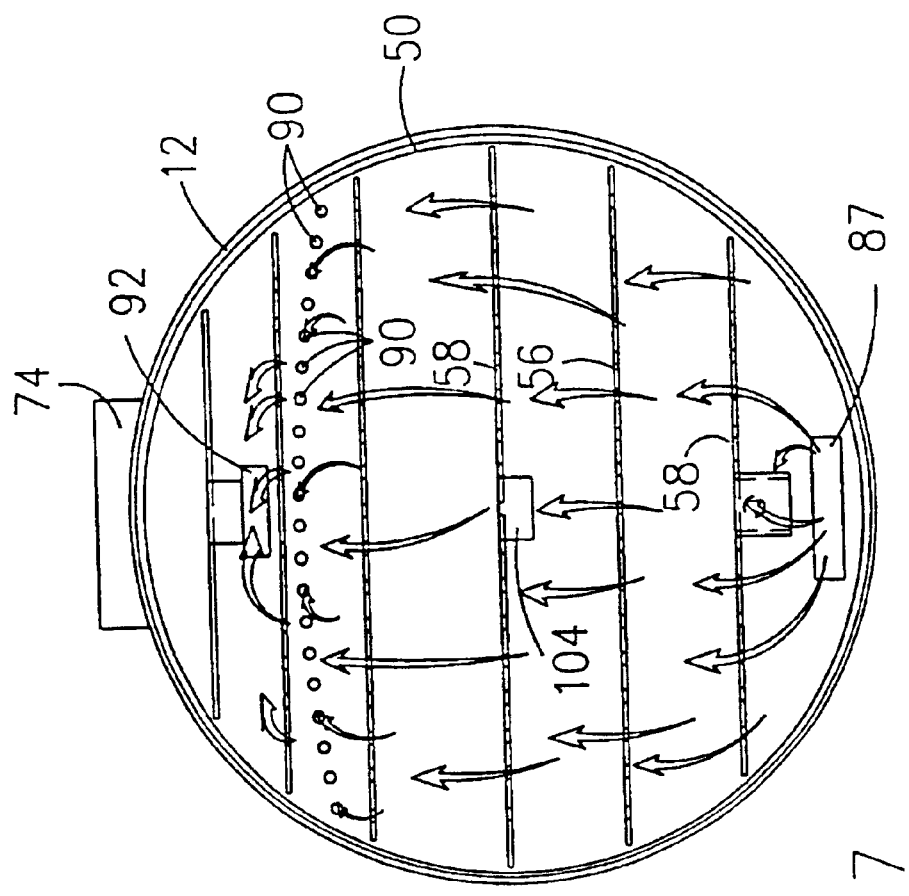
FIG. 7 is a representation of the airflow in the rear chamber formed in the stove of FIG. 1.

A baffle 76 (see FIGS. 4 and 6) is provided for illustration in combustion chamber shell 12 by any convenient method, is this instance a plurality of projecting abutments 77 are formed in the Inside of combustion chamber shell 12 which hold the baffle in its installed position. Baffle 76 is provided with a plurality of recesses 75 to allow easy Installation of the baffle in the combustion chamber 12.

A floor 78 is provided to be sealingly mounted in the lower region of combustion chamber shell 12.

Referring specifically to FIG. 1 door 36 is shown mounted on hinges 38 to cover the aperture formed in front closure member 14 for fueling the stove 10 and removing the ashes produced in combustion chamber of stove 10 therefrom. The front closure member 14 and the rear closure member 16 when assembled with shell 12 provides a sealed combustion chamber. The side shields 34 are mounted on the two closure members 14 and 16 so as to provide some clearance between the combustion chamber shell 12 and shields 34 to permit natural air to flow there between.

Figure 4:
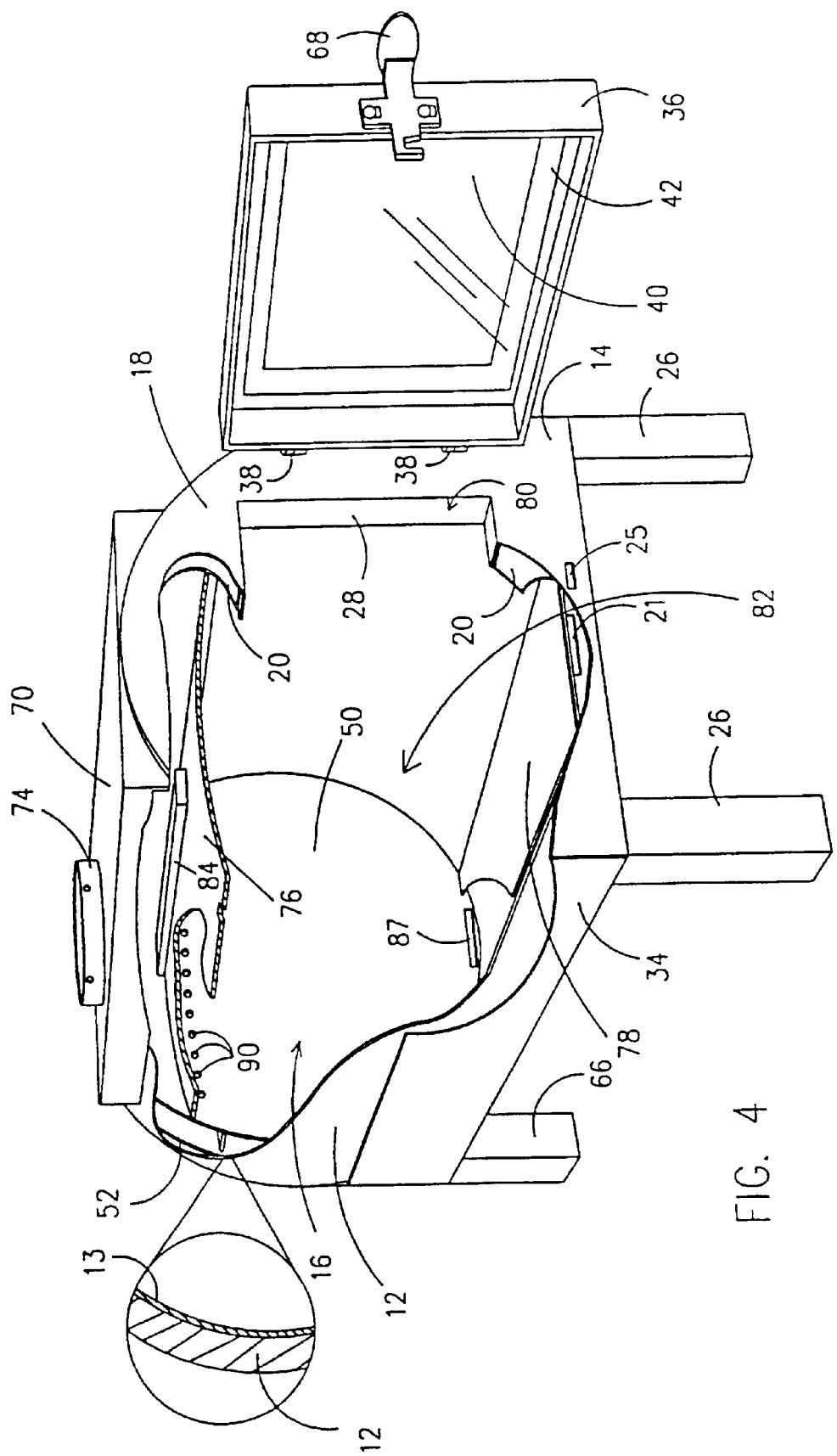
FIG. 4 is a partial sectional perspective view of the stove of FIG. 1.

Referring now specifically to FIG. 4, the various parts of the stove are shown in a partly sectioned perspective view of the stove 10. Here the opening 80 into combustion chamber 82 is clearly shown. The composite construction of front closure member 14 is also clearly shown, slider draft members 22 and 24 having been omitted for clarity. Ports 21 and 25 are shown in closure member 14.

Floor 78 is sealed into combustion chamber shell 12 as well as to front and rear closure members 14 and 16.

The inner plate member 50 of rear closure member 16 is clearly shown as is a portion of outer plate 52. Baffle 76 is shown mounted in combustion chamber shell 12.

A series of apertures 90 are shown in inner plate 50 to permit the escape of heated air into combustion chamber 82 from the rear closure member 16. A duct 84 is shown mounted on baffle 76.

FIG. 4 shows the enlarged view of a section of shell 12 having a glass coating 13 formed thereon. (The thickness of the glass coating 13 is typically 6 to 12 thousandths of an inch.)

Figure 5:
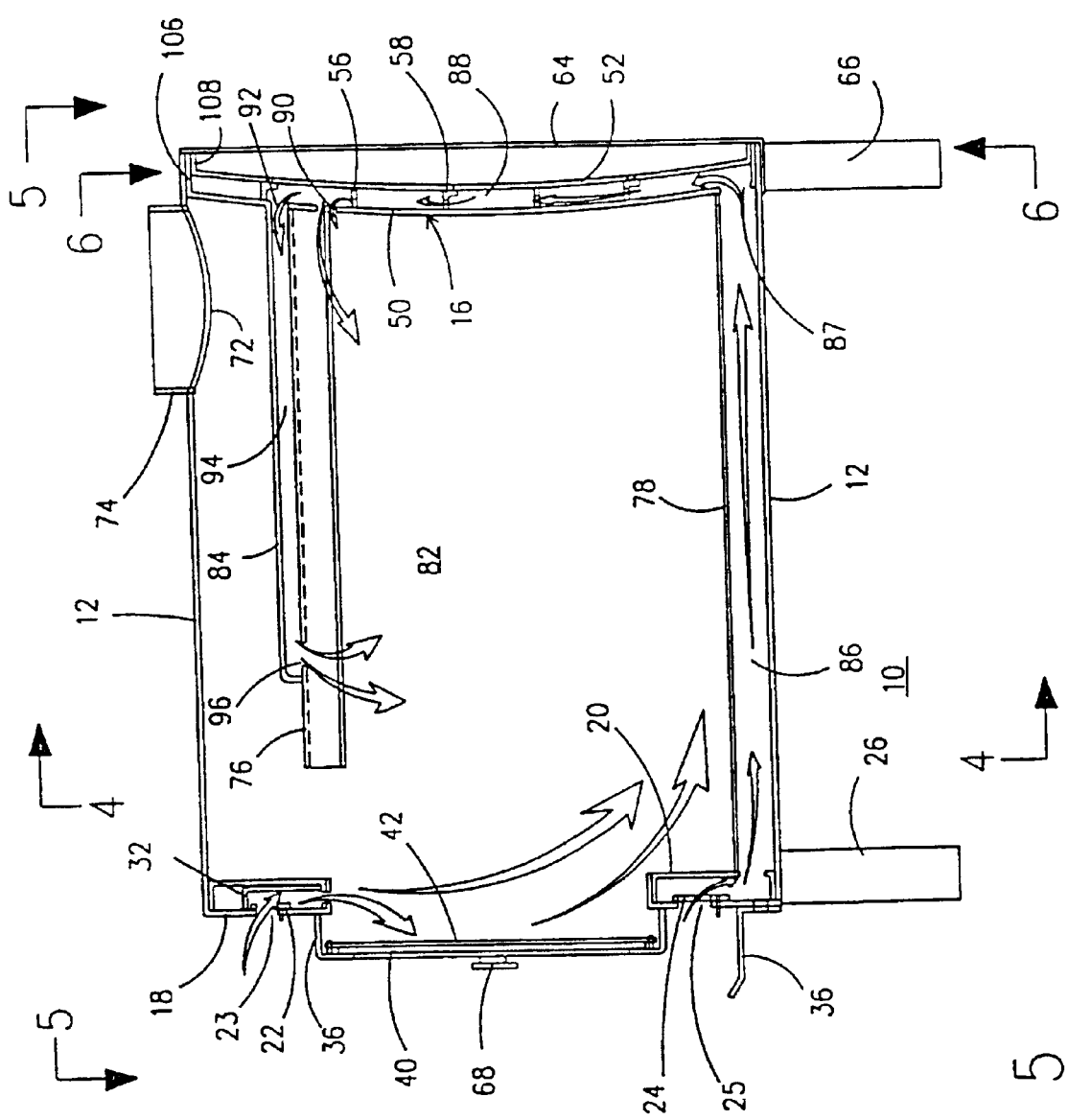
FIG. 5 is a side elevational sectional view of the stove of FIG. 1 showing the airflow pattern.

FIG. 5 shows the primary, secondary and tertiary airflow in stove 10.

Primary air enters front closure member 14 through ports 23, past slider damper 22 and down through ports in upper flange 28, 30 of door opening 80 to enter the combustion chamber 82 just above door glass 40. The cold air sweeps downwardly past glass 40 and curves toward the burning fuel in combustion chamber 82 to provide oxygen for the burning of the fuel.

At the same time secondary (and tertiary) air is admitted into ports shown as 25 in front closure member 14 and past slider damper 24 through ports 21 in inner panel 20 of front closure member 14 to enter a preheat heat exchanger 86 formed beneath floor 78 and above shell 12. As this secondary air travels through preheat heat exchanger 86 it is heated by the burning fuel. Preheat heat exchanger 86 ends at port 87 in inner rear panel member of rear closure 16. The heated air leaves preheated heat exchanger 86 and enters into chamber 17 of heat exchanger formed between plates 50 and 52 of rear closure member 16. Here plate 50 forms part of the combustion chamber 82 and this is deliberately exposed to intense heat from the burning fuel in the chamber.

The preheated air passes from preheat heat exchanger 86 and into port 87 of heat exchanger 88 and gathers more heat during passage therethrough. Secondary heated air exits at ports 90 formed in plate 50 near the top of the combustion chamber 82 and passes into the upper part of combustion chamber 82.

The construction of the heat exchanger of rear closure member 16 as shown in the exploded view FIG. 3 will not be described in detail. Plates 50 and 52 (form the heat exchanger) are joined at the outer periphery to form an enclosed plenum or chamber 17 therein. The plates 50 and 52 are preferably formed as surfaces of revolution (similar to bottom closure members in commercial hot water tanks).

Fins 56 and 58 may be curved to match the surface contour of heat exchanger 88 and are provided with teeth 100 which are separated by recesses 102. In the scheme shown the heat transfer fins 58 and 58 are provided with teeth 100 of equal width interrupted by a series of substantially identical recesses 102 therebetween. The fins are suitably fastened (usually by welding) to plate 50 at the intersection of each tooth 100 with the plenum or chamber side of plate 50. It is essential that fins 56 and 58 be in excellent heat transfer relationship in plate 50. The surface of plate 52 is made to match the surface of plate 50 and each of the fins 58 which are provided with tabs 104 are plug welded to plate 52. In the construction shown in this application plate 50 is provided with a peripheral lip 106 (see FIG. 5) which is press fined or welded into shell 12. Similarly, plate 52 is provided with a peripheral lip which is press fitted or welded into lip 106 of plate 50.

The importance of heat exchanger 88 to the overall performance of stove 10 cannot be over emphasized. It is important that invitiated air leaving heat exchanger 88 at exhaust ports 90 has acquired sufficient heat during passage through heat exchanger 88 to achieve a temperature as close as possible to the temperature existing in combustion chamber 82. Heat exchanger 88 is especially designed so that air entering port 87 in the lower region of plate 50 is allowed to steadily decrease in velocity as it rises in the chamber 17 until the mid-point of travel in the heat exchanger is reached. The heat exchanger air is now steadily accelerated during the last half of the passage through heat exchanger 88 until port 90 and port 92 are reached.

The slowing down of the air travelling through heat exchanger 88 allows the air to absorb a substantial amount of heat from the large central area of plate 50 and fins 56 and 58 so that the air exiting from ports 90 and 92 has acquired the maximum available amount of heat during passage through heat exchanger 88 to promote easy combustion of any unburned combustible gases or hydrocarbons encountered in the combustion chamber 82. It is essential that the air exiting from ports 90 and 92 has been heated to the highest possible temperature to facilitate the burning of any unburned hydrocarbons and other combustible gases which are emitted or pyrolized from the burning fuel. Typically the temperature of the heated air leaving ports 90 and 92 in an established fire in stove 10 would be from about 500 to 950° F.

The slowing down of the air travelling through plenum 88 allows the air to absorb a substantial amount of heat from the large central area of plate 50 and fins 56 and 58 so that the air exiting from ports 90 and 92 has acquired the maximum available amount of heat during passage through plenum 88 to promote easy combustion of any unburned combustible gases or hydrocarbons encountered in the combustion chamber 82. It is essential that the air exiting from ports 90 and 92 has been heated to the highest possible temperature to facilitate the burning of any unburned hydrocarbons and other combustible gases which are emitted or pyrolized from the burning fuel. Typically the temperature of the heated air leaving ports 90 and 92 in an established fire in stove 10 would be from about 500 to 950° F.

It is important that the surfaces of stove 10 which are exposed to the hot burning gasses produced during combustion are protected with a suitable barrier of a protective material. Although some metallic coatings are commercially available i.e. aluminized steel, the stove of this invention has an interior surface coating of a suitable glass material. This material must have an expansion coefficient which nearly matches the steel surface on which it is to be deposited in order to prevent cracking, crazing and peeling; the glass coating should also possess good heat transfer characteristics. The glass which has proved to be an excellent coating for this purpose is a high temperature glass having a content of titanium approaching 8%. It is essential that the interior surface of the combustion chamber etc. be coated with the above glass composition or an acceptable substitute. It is usually not necessary to coat the interior of duct 86 or the interior surfaces of plenum 88 with the glass material but these surfaces may in some instances be coated with a glass coating to preserve the surface integrity of these components if desired. Similarly heat transfer fins 56 and 58 may be glass coated (if desired) before final assembly of the rear closure member 16.

It will be found that the glass coated combustion chamber shell 12 yields heat in the shortest possible time when compared to heavy prior art stoves. Because there are no bricks or heavy castings used in the construction of the combustion chamber of this stove, the stove has a minimum thermal mass, thus enabling fast heat production from start-up.

The shape of stove 10 has been chosen to be as nearly cylindrical as is possible in order to achieve ease of manufacturing. Other shapes such as elliptical and polygonal are entirely possible. It is difficult to fabricate the rear closure member 16 to include a plenum 88 in an external configurative shape which is not circular. The construction of rear closure member 16 has been chosen to be light and robust (fins 58 fasten plates 50 and 52 together in an assembly) so that no banging or "oil canning" occurs during heating up or cooling down operations.

It may be found that in some jurisdictions the emission standards are somewhat relaxed from 40 U.S.C. Part 60. In these instances some of the components of stove 10 may be omitted. For instance insulating disc 60 (in the rear closure assembly 16) may be omitted (which slightly reduces the operating temperature of heat exchanger 88) as well as heat shield 64 in rear closure 16 in order to simplify the stove construction.

As well, the duct 84 located on top of baffle may be omitted from some models in countries where emission requirements are not as stringent as the U.S. The supply of hot "tertiary" air at the front of the combustion chamber is present to meet stiff environmental standards for present and future and to assure that any combustible products which have escaped combustion by the primary and secondary circulated air are exposed to the hot "tertiary" air to promote in one last combustion attempt before such gases are released up the flue.

Baffle 76 is an essential element of this construction in order to cause the hot gases to linger in the combustion chamber for a longer duration than would occur in the absence of baffle 76. Baffle 76 may be attached to the combustion chamber shell in a number of ways, but it has been found that the baffle may be held in place by four (preferably) projecting abutments 77 from the surface of shell 12 which hold baffle 76 in place. Baffle 76 is provided with four recesses such as 75 shown in FIG. 6 which permit baffle to be installed in stove 10. Recesses 75 are lined up with projections 77 and baffle 76 is bowed upwardly by pushing upwardly in the centre of baffle to position baffle 76 above abutments 77. As soon as baffle 76 is bowed upwardly between the projecting abutments 77 the necessary clearance between the baffle and the surface of combustion chamber shell 12 is obtained the baffle may be slid rearwardly to its "home" position (against plate 50). Baffle 76 is then allowed to relax to an intermediate position which spring loads the baffle against and between the projections 77. Because the baffle is still bowed in an upwardly convex shape, any dimensional changes occurring in baffle 76 during start up or shut down do not produce annoying clicks and bangs due to expansion and contraction of the baffle 76 or the shell 12 in which the projections 77 holding the baffle 76 in place are formed. The curved shape of the baffle 76 assures that any distortions of the baffle which occur will proceed in a predictable manner.

Figure 11:
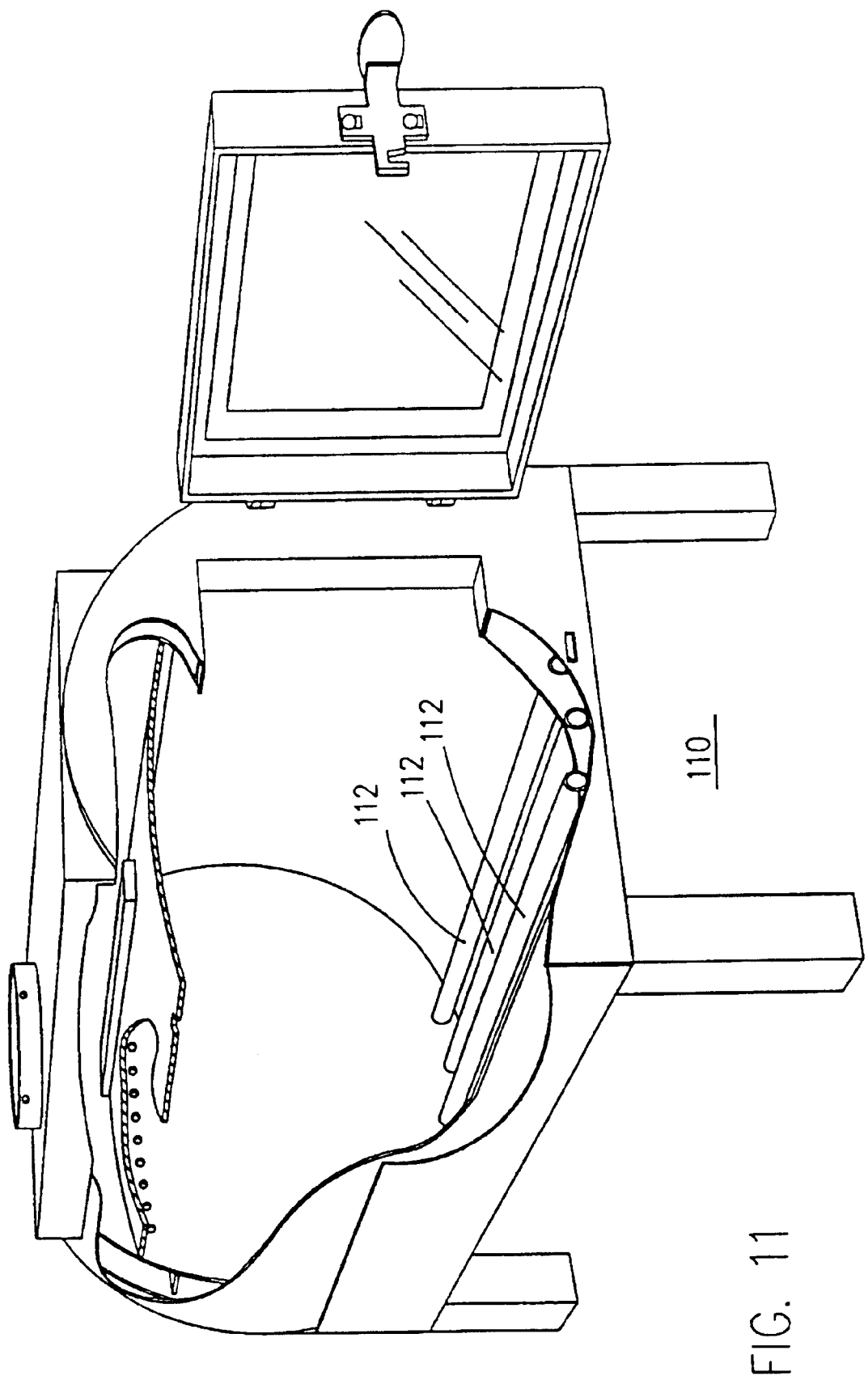
FIG. 11 shows a perspective view of an alternative stove construction.

To those skilled in the art, changes and alterations will become immediately apparent once the basic design is disclosed. For instance, FIG. 11 shows an alternative embodiment in the stove 110 Illustrated, in which the preheat heat exchanger 86 shown in FIG. 5 is replaced by a series of tubular ducts 112 in the combustion chamber on which fuel to be burned is placed. The tubes 112 function as efficiently as the preheat heat exchanger 88 (produced by floor 78 and shell 12) in performing a heat transfer to air passing through the tubes. It will be obvious to one skilled in the art that other methods of directing the secondary air are possible which still achieve the required heat absorption The disclosure has been relatively silent regarding the presence of heat shielding applied to the stove for applications where safety is a concern. Because of a variation in safety laws, a variety of shielding devices for the stove are possible. Side panels 34 and rear shield 64 have been included in this description but certainly other heat shields i.e. belly shield may be included for various heating applications as the situation demands. In most instances the presence or absence of heat shields such as 34 and 64 have little effect on the overall stove efficiency or the E.P.A. rating, but the shields do affect the temperature of surrounding walls and objects in the immediate area of the stove.

In summary, a long life lightweight stove has been disclosed which is easy to fabricate, transport and install.

Much of the success of this stove is due to the protection provided to the steel enclosure by the protective coating. Aluminized steel provides a measure of protection and is available commercially. However, a continuous layer of a self-cleaning high temperature glass on the interior surface of the combustion chamber is the preferred coating for this application.

Heat exchanger 88 formed between plates 50 and 52 have the general shape of a Belville washer and a real advantage is gained by the production of an enlarged curved surface area of plate 50 facing the burning fuel (when compared to plate 50 if it was flat). The fins 56 and 58 must be curved to match the curving interior surface of heat exchanger 88. The teeth and recesses of the fins 56 and 58 may be varied in width to slightly increase the resistance to air flow in the centre of the heat exchanger 88, thus forcing the moving air to spread out across the chamber 17.

Door 36 of stove 10 has been illustrated with a fire viewing glass 40 installed therein. It will be obvious that door 36 may be a solid door.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A wood burning stove (10) comprising an enclosure suitable for receiving and burning wood in said enclosure, said enclosure being formed of sheet metal defining a central body (12) having a non-linear surface in which first and second end closure members (14,16) are sealingly attached,
    an access opening (80) in said first and closure member (14) for introducing wood into said enclosure and removing ashes from said enclosure,
    a door (36) for closing said access opening (80), in said first end enclosure member (14),
    an exhaust vent (74) formed In said enclosure remote from said first end closure member (14) for allowing gaseous products of combustion to escape from said enclosure,
    heat exchanger means (88) formed in said second end closure member (16) for extracting heat from said enclosure during a burning process, said heat exchanger means (88) having lower port means (87) and upper port means (90, 92) formed therein for receiving and discharging air therefrom,
    a baffle (76) extending across the top of said central body (12), in contact with said [plenum] heat exchanger means (88) and extending forwardly in said central body (12) toward said first end closure member (14),
    air admission means (24, 25, 21) formed in said stove for admitting and directing a controlled portion of air admitted into said heat exchanger means (88).

2. A stove (10) as claimed in claim 1 wherein preheat heat exchanger means (86) is disposed at the bottom of said enclosure for exposure to said burning wood, said preheat heat exchanger means communicating with said air admission means (24, 25, 21) and said heat exchanger means (88) so as to absorb heat generated in said enclosure and deliver heated air to said heat exchanger means (88).

3. A stove (10) as claimed in claim 2 wherein said enclosure and said preheat heat exchanger means (86) exposed to said burning wood is coated with glass material (13).

4. A stove (10) as claimed in claim 1 wherein baffle means (76) is mounted in said enclosure beneath said exhaust vent (74).

5. A stove (10) as claimed in claim 1 wherein said baffle means (76) extend forwardly from said heat exchanger means (88) toward said first end closure member (14) across said enclosure to prevent exposure of said exhaust vent (74) to said wood.

6. A stove (10) as claimed in claim 4 wherein baffle means (76) is installed against said heat exchanger means (88) so as to extend toward said first end closure member (14) across said enclosure to shield said exhaust vent (74) from said wood, duct means (84) associated with said baffle means (76) and said heat exchanger means (88) to lead hot tertiary air from said upper port means (92) to discharge vents (96) located within said baffle (76) between said heat exchanger means (88) and said door (36).

7. A stove (10) as claimed in claim 1 wherein said heat exchanger means (88) comprises a hollow chamber (17) having air velocity changing means (55, 56) incorporated therein between said lower port means (87) and said upper port means (90, 92).

8. A wood burning stove (10) having an enclosure defining an area for burning wood therein beneath baffle means (76) formed in said enclosure, said enclosure having a curved surface having a front closure member (14) and a rear closure member (16) sealedly attached thereto, and suitable legs (26, 66) attached to said stove (10) for supporting said stove,
    exhaust vent means (74) formed adjacent said rear closure member (16) in the top of said enclosure for attachment to a flue pipe, said rear closure member (16) having the general shape of a saucer and being in the form of a heat exchanger (88) for heating air contained therein, secondary air inlet and control means (25, 21, 24) in said stove (10) for admitting a predetermined quantity of air into said stove (10),
    at least one preheat heat exchanger (86) associated with said draft inlet and control means (25, 21, 24) to lead air from said draft control means (24, 25, 21) through said stove (10) to said heat exchanger (88) to extract heat from said enclosure,
    outlet port means (90) on said heat exchanger (88) for discharging heated air from said heat exchanger (88) into said enclosure.

9. A stove as claimed in claim 8 wherein said baffle means (76) is installed in said enclosure between said exhaust vent (74) and said area to prevent direct discharge of combustion products directly from said wood to said exhaust vent (74).

10. A stove (10) as claimed in claim 8 wherein said baffle means (76) is located near the top of said enclosure, and wherein said baffle (76) prevents the direct exposure of said area to said vent (74), said baffle (76) means being bent into an arcuate shape.

11. A heat exchanger (88) for extracting heat from burning fuel in a stove (10) comprising spaced inner heat exchanger wall (50) and outer heat exchanger wall 52, said inner heat exchanger wall (50) having a convex surface (50) exposed to the burning fuel,
    said heat exchanger (88) having an inlet means (87) and air exhaust means (90) to permit air to flow through said heat exchanger 88 by convection;
    air dispersion means (56,58) formed Within said heat exchanger (88) to force air passing therethrough to pass through a series of interstices (100) within said heat exchanger (88) to maximize surface contact with said air during passage through said heat exchanger (88).

12. A heat exchanger (88) as claimed in claim 11 wherein said heat exchanger (88) is shaped to produce a change in velocity of air as it passes between said inlet means (87) and outlet means (90,92) within said heat exchanger 88.

13. A heat exchanger (88) for extracting heat from burning fuel in a high efficiency stove (10) comprising a chamber (17) being Installed in one of the walls of said stove (10), said chamber (17) having a convex surface (50) exposed to burning fuel
    said heat exchanger (68) having an inlet means (87), and air exhaust means (90) to permit air to flow through said heat exchanger (88) by convection air dispersion means (56, 58) formed within said heat exchanger (88) to force air passing therethrough to pass through a series of interstices (100) within said chamber (17) to maximize surface contact with said air during passage through said chamber (17)

wherein the velocity of air passing between said air inlet means (87) and air exhaust means (90, 92) within said heat exchanger (88) is a minimum of the center of said heat exchanger 88.

14. A heat (88) as claimed in claim 13 which has a curved surface of revolution somewhat spheroidal.

15. A heat exchanger (88) for extracting heat from burning fuel in a high efficiency barrel shaped wood burning stove (10) comprising:

a dished chamber 17 having an inner surface (50) spaced from an outer surface (52) formed as one end (50, 52) of said stove (10), wherein said inner surface (50) of the hollow chamber 17 is non-planar and exposed to the fuel burning in said stove (10), air admission means (87) and exhaust means (90) formed in said heat exchanger (88) to permit air to pass into and through said heat exchanger (88) from the air admission means (87) and exit through said air exhaust means (90), said air passing through said heat exchanger (88) by the force of natural convection, air dispersion means (56, 58) formed in said heat exchanger (88) to maximize the heat recovery by said air during passage through said heat exchanger (88).

16. A heat exchanger (88) as claimed in claim 15 wherein a said air dispersion means (56, 58) comprises a plurality of shaped heat transfer fins (56, 58), mounted within said heat exchanger (88) to promote the dispersion of air and the absorption of heat by air passing through said heat exchanger (88).

17. A heat exchanger (88) as claimed in claim 16 wherein the dished chamber 17 is formed into the shape of an oblate spheroid.

18. A heat exchanger (88) for the production of hot invitiated air in a high efficiency wood burning stove (10) in which said stove (10) comprises a cylindraceous combustion chamber in which said heat exchanger (88) forms part of said combustion chamber (82), said heat exchanger (88) being formed by a pair of dished plates (50, 52) formed into a convex arcuate surface of revolution joined together at the periphery of the plates (50, 52) to produce a chamber 17 so that said heat exchanger (50, 52) presents a convex surface to said combustion chamber (82), at least one inlet port (87) formed near the bottom of said heat exchanger (88) to permit invitiated air to enter said heat exchanger (88), at least one exit port (90) located above said inlet port (87) to permit heat invitiated air to be delivered to predetermined locations in said combustion chamber (82).

19. A wood burning stove having a sheet metal enclosure with an inlet and outlet where an interior surface of said sheet metal enclosure exposed to combustion is coated with glass material having a co-efficient of expansion substantially the same as the co-efficient of expansion of said sheet metal enclosure.

20. A wood burning stove as claimed in claim 19 wherein said glass material comprises high temperature glass with up to 8% by weight of titanium.

21. A wood burning stove as claimed in claim 19 wherein the thickness of said glass is between 6 to 12 thousands of an inch.

22. A wood burning stove as claimed in claim 21 wherein said enclosure presents:

(a) a generally circular central body (12) extending along a generally horizontal axis;

(b) first end closure (14) and a second end closure (16) sealingly attached to said central body (12).

23. A wood burning stove comprising:

(a) an enclosure having a front closure member (14) and a rear closure member (16);

(b) said front closure member including a door for access to said enclosure;

(c) a primary port disposed above said door to permit primary air to enter through said front closure to provide combustion air for burning said wood;

(d) a preheat heat exchanger sealingly disposed within said enclosure below said door, and directly exposed to combustion of wood in said enclosure, (e) a secondary port disposed below said door to permit secondary air to enter through said front closure and through said preheat heat exchanger for preheating by said burning wood;

(f) said rear closure member presently a heat exchanger communicating with said preheat heat exchanger so as to continue heating said secondary air as it rises through said heat exchanger;

(g) said preheat heat exchanger and said heat exchanger both directly exposed to said combustion of wood so as to heat said secondary air;

(h) baffle means connected to and communicating with said heat exchanger means in the region above said preheat heat exchanger;

(i) said heat exchanger including ports below said baffle means for introducing heated secondary air into said enclosure;

(j) duct means associated with said baffle means to communicate with said heat exchanger means, for directing a portion of said heated air in said heat exchanger through said second duct means for further heating so as to exhaust tertiary heated air into said enclosure.

24. A wood burning stove as claimed in claim 23 wherein said enclosure comprises sheet metal.

* * * * *